US012367804B2

(12) United States Patent
Shi

(10) Patent No.: US 12,367,804 B2
(45) Date of Patent: Jul. 22, 2025

(54) GATE DRIVING CIRCUIT AND DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Wenbo Shi, Guangdong (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/532,761

(22) Filed: Dec. 7, 2023

(65) Prior Publication Data

US 2024/0144855 A1 May 2, 2024

Related U.S. Application Data

(63) Continuation of application No. 18/059,255, filed on Nov. 28, 2022, now Pat. No. 11,908,378.

(30) Foreign Application Priority Data

Nov. 2, 2022 (CN) ......................... 202211364213.3

(51) Int. Cl.
*G09G 3/20* (2006.01)

(52) U.S. Cl.
CPC ... *G09G 3/2092* (2013.01); *G09G 2310/0267* (2013.01)

(58) Field of Classification Search
CPC ......... G09G 3/2092; G09G 2310/0267; G09G 2300/0408; G09G 2310/08; G09G 3/20
See application file for complete search history.

(56) References Cited

U.S. PATENT DOCUMENTS 7,522,160 B2 * 4/2009 Moon .................. G09G 3/3674 345/204
10,339,871 B2 * 7/2019 Zeng .................... G09G 3/3677
(Continued)

FOREIGN PATENT DOCUMENTS

CN 101093647 A 12/2007
CN 103258514 A 8/2013
(Continued)

OTHER PUBLICATIONS

Chinese Office Action issued in corresponding Chinese Patent Application No. 202211364213.3 dated Oct. 12, 2024, pp. 1-11.

*Primary Examiner* — Jose R Soto Lopez
(74) *Attorney, Agent, or Firm* — PV IP PC; Christopher S. Ruprecht; Wei Te Chung

(57) ABSTRACT

The present application provides a gate driving circuit and a display panel. The gate driving circuit includes a plurality of cascaded gate driving units, where each of the plurality of cascaded gate driving units includes a pull-up control module, an inversion module and a feedback module. The potential of the pull-up node is stepwise increased by the pull-up control module, so that the feedback module can be controlled to be turned off by the inversion module when the potential of the pull-up node is lower, thereby improving a phenomenon of leakage of the pull-up node through the feedback module.

15 Claims, 3 Drawing Sheets

(56) References Cited

U.S. PATENT DOCUMENTS

| | | | | |
|---|---|---|---|---|
| 11,908,378 | B1 * | 2/2024 | Shi | G09G 3/2092 |
| 2006/0119560 | A1 * | 6/2006 | Jeon | G09G 3/3696<br>345/98 |
| 2015/0371599 | A1 * | 12/2015 | Xiao | G09G 3/36<br>345/212 |
| 2017/0169787 | A1 * | 6/2017 | Zhang | G09G 3/3677 |
| 2018/0211629 | A1 * | 7/2018 | Zeng | G09G 3/36 |
| 2018/0218696 | A1 * | 8/2018 | Du | G09G 3/3659 |
| 2019/0051262 | A1 * | 2/2019 | Chen | G09G 3/3677 |
| 2019/0096348 | A1 * | 3/2019 | Xu | G09G 3/3677 |
| 2019/0103167 | A1 * | 4/2019 | Zeng | G11C 19/287 |
| 2020/0043431 | A1 * | 2/2020 | Li | G09G 3/3266 |
| 2020/0365107 | A1 * | 11/2020 | Li | G09G 3/3677 |
| 2021/0319763 | A1 * | 10/2021 | Xu | G09G 3/3677 |
| 2021/0335310 | A1 * | 10/2021 | Zhu | G09G 3/3677 |
| 2022/0114934 | A1 * | 4/2022 | He | G11C 19/28 |
| 2022/0309975 | A1 * | 9/2022 | Lv | G09G 3/20 |
| 2022/0309988 | A1 * | 9/2022 | Xi | G09G 3/20 |
| 2022/0351697 | A1 * | 11/2022 | Li | G09G 3/3677 |
| 2022/0358898 | A1 * | 11/2022 | Jeong | G09G 3/3266 |

FOREIGN PATENT DOCUMENTS

| | | | |
|---|---|---|---|
| CN | 104966505 | A | 10/2015 |
| CN | 112185311 | A | 1/2021 |
| CN | 114026633 | A | 2/2022 |
| CN | 114913828 | A | 8/2022 |
| CN | 114944123 | A | 8/2022 |

* cited by examiner

GATE DRIVING CIRCUIT AND DISPLAY PANEL

CROSS-REFERENCE TO RELATED APPLICATION

This application is a continuation application of U.S. application Ser. No. 18/059,255, filed on Nov. 28, 2022, which claims priority to Chinese Patent Application No. 202211364213.3, filed on Nov. 2, 2022. The entire disclosures of the above applications are incorporated herein by reference.

TECHNICAL FIELD

The present application relates to the field of display technologies, and more particularly to a gate driving circuit and a display panel thereof.

BACKGROUND

In each of various gate driving units of a gate driving circuit, the potential of a pull-up node is generally increased by a pull-up control module. However, since the output potential of the pull-up control module is generally constant, the potential of the pull-up node is increased at a faster speed, which causes leakage of the pull-up node.

SUMMARY

The present application provides a gate driving circuit and a display panel, so as to alleviate a technical problem of leakage of the pull-up node.

In a first aspect, the present application provides a gate driving circuit, including: a plurality of cascaded gate driving units, wherein each of the plurality of cascaded gate driving units includes: a pull-up control module, wherein an output terminal of the pull-up control module is connected to a pull-up node, for stepwise increasing a potential of the pull-up node; an inversion module, wherein an input terminal of the inversion module is connected to the pull-up node, for outputting an anti-leakage control signal in response to an increased potential of the pull-up node; and a feedback module, wherein a control terminal of the feedback module is connected to an output terminal of the inversion module, one terminal of the feedback module is connected to the pull-up node, and another terminal of the feedback module is connected to a first low potential line, for reducing leakage from the pull-up node to the first low potential line in response to the anti-leakage control signal.

In some embodiments, the pull-up node is configured to provide a pull-up control signal including at least one step pulse, wherein each step pulse of the at least one step pulse includes a first potential pulse and a second potential pulse in succession, and a potential of the first potential pulse is lower than a potential of the second potential pulse.

In some embodiments, each step pulse further includes a third potential pulse following the second potential pulse, the potential of the second potential pulse being lower than the potential of the third potential pulse.

In some embodiments, the pull-up control module includes a pull-up control transistor, wherein one of a source/drain of the pull-up control transistor is connected to a Jth stage scanning line, a gate of the pull-up control transistor is connected to a Jth stage cascade line, and another one of the source/drain of the pull-up control transistor is connected to the pull-up node; and wherein the Jth stage scanning line is configured to transmit a Jth stage scanning signal having a trimmed rising edge, and the Jth stage cascade line is configured to transmit a Jth stage cascade signal having a trimmed rising edge.

In some embodiments, each of the gate driving units further includes: a pull-up transistor, wherein one of a source/drain of the pull-up transistor is connected to an Nth stage clock line, a gate of the pull-up transistor is connected to the pull-up node, and another one of the source/drain of the pull-up transistor is connected to an Nth stage scanning line; and a cascade transistor, wherein one of a source/drain of the cascade transistor is connected to the Nth stage clock line, a gate of the cascade transistor is connected to the pull-up node, and another one of the source/drain of the cascade transistor is connected to an Nth stage cascade line; wherein the Nth stage clock line is configured to transmit an Nth stage clock signal having a trimmed rising edge; the Nth stage scanning line is configured to transmit an Nth stage scanning signal having a trimmed rising edge, a waveform of the Nth stage scanning signal is the same as a waveform of the Jth stage scanning signal and a phase of the Nth stage scanning signal lags behind a phase of the Jth stage scanning signal; a waveform of the Nth stage cascade signal is the same as a waveform of the Jth stage cascade signal, and a phase of the Nth stage cascade signal lags behind a phase of the Jth stage cascade signal.

In some embodiments, an initial moment of the trimmed rising edge is the same as an initial moment of a rising edge of the Nth stage clock signal in timing, and a ratio of a duration of the trimmed rising edge to a pulse duration of the Nth stage clock signal is greater than or equal to ¼ and less than or equal to ⅓.

In some embodiments, a ratio of a potential of the trimmed rising edge to a pulse amplitude of the Nth stage clock signal is greater than or equal to ⅓ and less than or equal to ⅔.

In some embodiments, a ratio of a potential of the trimmed rising edge to a pulse amplitude of the Nth stage clock signal is ½.

In some embodiments, the inversion module includes a first inversion sub-module, wherein the first inversion sub-module includes a first transistor, a second transistor, a third transistor, and a fourth transistor, wherein, one of a source/drain of the first transistor is connected to all of a first low frequency control line, one of a source/drain of the second transistor, and a gate of the first transistor, another one of the source/drain of the first transistor is connected to both a gate of the second transistor and one of a source/drain of the third transistor, another one of the source/drain of the second transistor is connected to one of a source/drain of the fourth transistor, a gate of the third transistor is connected to the pull-up node and a gate of the fourth transistor, and the first low potential line is connected to both another one of the source/drain of the third transistor and another one of the source/drain of the fourth transistor; and the feedback module includes a first feedback transistor, wherein one of a source/drain of the first feedback transistor is connected to the pull-up node, a gate of the first feedback transistor is connected to both another one of the source/drain of the second transistor and the one of the source/drain of the fourth transistor, and another one of the source/drain of the first feedback transistor is connected to the first low potential line.

In some embodiments, the inversion module further includes a second inversion sub-module, wherein the second inversion sub-module includes a fifth transistor, a sixth transistor, a seventh transistor, and an eighth transistor, wherein, one of a source/drain of the fifth transistor is connected to all of a second low frequency control line, one of a source/drain of the sixth transistor, and a gate of the fifth transistor, another one of the source/drain of the fifth transistor is connected to both a gate of the sixth transistor and one of a source/drain of the seventh transistor, another one of the source/drain of the sixth transistor is connected to one of a source/drain of the eighth transistor, a gate of the seventh transistor is connected to both the pull-up node and a gate of the eighth transistor, and the first low potential line is connected to both another one of the source/drain of the seventh transistor and another one of the source/drain of the eighth transistor; the feedback module includes a second feedback transistor, wherein one of a source/drain of the second feedback transistor is connected to the pull-up node, a gate of the second feedback transistor is connected to both another one of the source/drain of the sixth transistor and the one of the source/drain of the eighth transistor, and another one of the source/drain of the second feedback transistor is connected to the first low potential line.

In a second aspect, the present application provides a gate driving circuit including a plurality of cascaded gate driving units, wherein each of the plurality of cascaded gate driving units includes: a pull-up control transistor, wherein one of a source/drain of the pull-up control transistor is connected to a Jth stage scanning line, a gate of the pull-up control transistor is connected to a Jth stage cascade line, and another one of the source/drain of the pull-up control transistor is connected to the pull-up node; a first transistor, wherein one of a source/drain of the first transistor is connected to both a first low frequency control line and a gate of the first transistor; a second transistor, wherein one of a source/drain of the second transistor is connected to the one of the source/drain of the first transistor, and a gate of the second transistor is connected to another one of the source/drain of the first transistor; a third transistor, wherein one of a source/drain of the third transistor is connected to another one of the source/drain of the first transistor, a gate of the third transistor is connected to the pull-up node, and another one of the source/drain of the third transistor is connected to the first low potential line; a fourth transistor, wherein one of a source/drain of the fourth transistor is connected to another one of the source/drain of the second transistor, a gate of the fourth transistor is connected to the pull-up node, and another one of the source/drain of the fourth transistor is connected to the first low potential line; a first feedback transistor, wherein one of a source/drain of the first feedback transistor is connected to the pull-up node, a gate of the first feedback transistor is connected to both another one of the source/drain of the second transistor and the one of the source/drain of the fourth transistor, and another one of the source/drain of the first feedback transistor is connected to the first low potential line; wherein the Jth stage scanning line is configured to transmit a Jth stage scanning signal having a trimmed rising edge, and the Jth stage cascade line is configured to transmit a Jth stage cascade signal having a trimmed rising edge.

In some implementations, each of the plurality of cascaded gate driving units further includes: a fifth transistor, wherein one of a source/drain of the fifth transistor is connected to both a second low frequency control line and a gate of the fifth transistor; a sixth transistor, wherein, one of a source/drain of the sixth transistor is connected to the one of the source/drain of the fifth transistor, and a gate of the second transistor is connected to another one of the source/drain of the fifth transistor; a seventh transistor, wherein, one of a source/drain of the seventh transistor is connected to another one of the source/drain of the fifth transistor, a gate of the seventh transistor is connected to the pull-up node, and another one of the source/drain of the seventh transistor is connected to the first low potential line; an eighth transistor, wherein, one of a source/drain of the eighth transistor is connected to another one of the source/drain of the sixth transistor, a gate of the eighth transistor is connected to the pull-up node, and another one of the source/drain of the eighth transistor is connected to the first low potential line; and a second feedback transistor, wherein, one of a source/drain of the second feedback transistor is connected to the pull-up node, a gate of the second feedback transistor is connected to another one of the source/drain of the sixth transistor and the one of the source/drain of the seventh transistor, and another one of the source/drain of the second feedback transistor is connected to the first low potential line.

In some embodiments, each of the gate driving units further includes: a pull-up transistor, wherein one of a source/drain of the pull-up transistor is connected to an Nth stage clock line, a gate of the pull-up transistor is connected to the pull-up node, and another one of the source/drain of the pull-up transistor is connected to an Nth stage scanning line; and a cascade transistor, wherein one of a source/drain of the cascade transistor is connected to the Nth stage clock line, a gate of the cascade transistor is connected to the pull-up node, and another one of the source/drain of the cascade transistor is connected to an Nth stage cascade line; wherein the Nth stage clock line is configured to transmit an Nth stage clock signal having a trimmed rising edge; the Nth stage scanning line is configured to transmit an Nth stage scanning signal having a trimmed rising edge, a waveform of the Nth stage scanning signal is the same as a waveform of the Jth stage scanning signal and a phase of the Nth stage scanning signal lags behind a phase of the Jth stage scanning signal; a waveform of the Nth stage cascade signal is the same as a waveform of the Jth stage cascade signal, and a phase of the Nth stage cascade signal lags behind a phase of the Jth stage cascade signal.

In a third aspect, the present application provides a display panel including the gate driving circuit in at least one of the above-described embodiments.

According to the gate driving circuit and the display panel provided in the present application, the potential of the pull-up node is stepwise increased by the pull-up control module, so that the potential increasing speed of the pull-up node is reduced. When the potential of the pull-up node is lower, the feedback module can be controlled to be turned off by the inversion module, thereby improving a phenomenon of leakage of the pull-up node through the feedback module.

In addition, the leakage of the feedback module is reduced or avoided, which improves an abnormal operation of the feedback module and facilitates improvement of the service life of the feedback module and the charging saturation of the pull-up node, thereby improving the operation reliability of the gate driving circuit.

In addition, the pull-up module stepwise increases the potential of the pull-up node, which may affect the potential charging speed of the pull-up node. However, since the effective charging time of the control data signal is usually located in the pulse duration of the rear part of the scanning signal which is output by the gate driving circuit during charging of the control data signal, the pulse duration of the front part of the scanning signal does not affect the effective charging time regardless of the waveform.

BRIEF DESCRIPTION OF THE DRAWINGS

Technical solutions and other beneficial effects of the present application are apparent below from detailed description of the embodiments of the present application in combination with the accompanying drawings.

EMBODIMENTS OF THE PRESENT DISCLOSURE

Technical solutions in embodiments of the present application will be clearly and completely described below in conjunction with drawings in the embodiments of the present application. Obviously, the described embodiments are only a part of embodiments of the present disclosure, rather than all the embodiments. Based on the embodiments in the present application, all other embodiments obtained by those skilled in the art without creative work fall within the protection scope of the present application.

Figure 1:
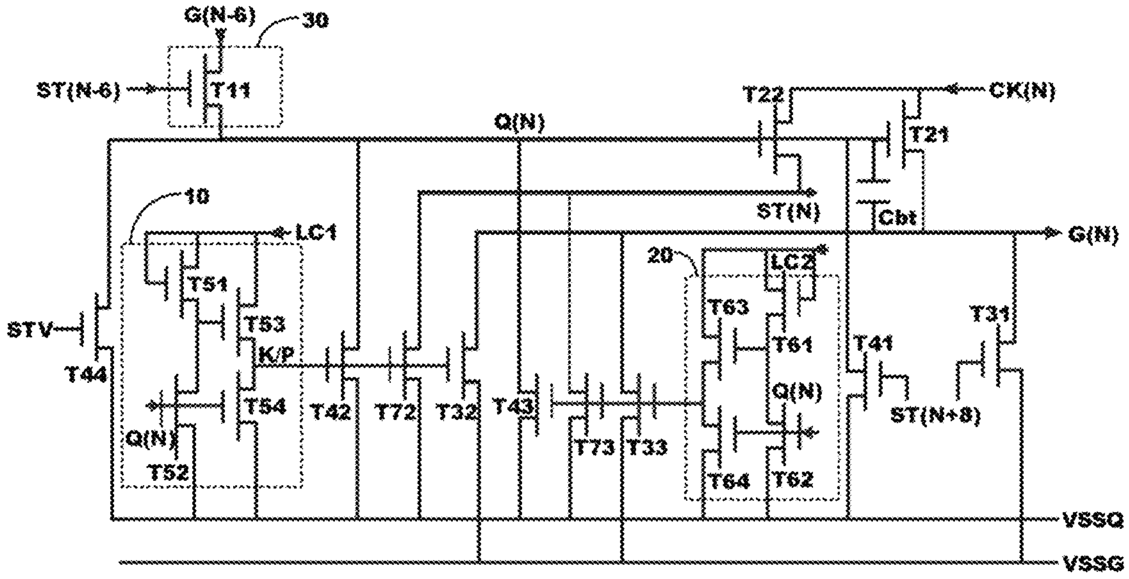
FIG. 1 is a structural diagram of a gate driving circuit according to an embodiment of the present application.

An embodiment of the present application provides a gate driving circuit, as shown in FIG. 1. The gate driving circuit includes a plurality of cascaded gate driving units, where each of the plurality of cascaded gate driving units includes: a pull-up control module 30, where an output terminal of the pull-up control module 30 is connected to a pull-up node Q(N); an inversion module, where an input terminal of the inversion module is connected to the pull-up node Q(N); and a feedback module, where a control terminal of the feedback module is connected to an output terminal of the inversion module, one terminal of the feedback module is connected to the pull-up node Q(N), and another terminal of the feedback module is connected to a first low potential line.

The first low potential line is configured to transmit a first low potential signal VSSQ having a potential smaller than or equal to −8V, and more specifically having −10V, −12V, −15V, −18V, −20V, and −28V and so on.

In an embodiment, the pull-up control module 30 includes a pull-up control transistor T11, where one of a source/drain of the pull-up control transistor T11 is connected to a Jth stage scanning line, a gate of the pull-up control transistor T11 is connected to a Jth stage cascaded line, and another one of the source/drain of the pull-up control transistor T11 is connected to the pull-up node Q(N).

The Jth stage scanning line is configured to transmit a Jth stage scanning signal. The Jth stage cascade line is configured to transmit a Jth stage cascade signal. J is a positive integer.

In an embodiment, the inversion module includes a first inversion sub-module 10, where the first inversion sub-module 10 includes a first transistor T51, a second transistor T53, a third transistor T52, and a fourth transistor T54. One of a source/drain of the first transistor T51 is connected to a first low frequency control line, one of a source/drain of the second transistor T53, and a gate of the first transistor T51, another one of the source/drain of the first transistor T51 is connected to a gate of the second transistor T53 and one of a source/drain of the third transistor T52, another one of the source/drain of the second transistor T53 is connected to one of a source/drain of the fourth transistor T54, a gate of the third transistor T53 is connected to the pull-up node Q(N) and a gate of the fourth transistor T54, and the first low potential line is connected to another one of the source/drain of the third transistor T52 and another one of the source/drain of the fourth transistor T54.

The first low frequency control line is configured to transmit a first low frequency control signal LC1.

In an embodiment, the inversion module further includes a second inversion sub-module 20, where the second inversion sub-module 20 includes a fifth transistor T61, a sixth transistor T63, a seventh transistor T62, and an eighth transistor T64. One of a source/drain of the fifth transistor T61 is connected to a second low frequency control line, one of a source/drain of the sixth transistor T63, and a gate of the fifth transistor T61, another one of the source/drain of the fifth transistor T61 is connected to a gate of the sixth transistor T63 and one of a source/drain of the seventh transistor T62, another one of the source/drain of the sixth transistor T63 is connected to one of a source/drain of the eighth transistor T64, a gate of the seventh transistor T62 is connected to the pull-up node Q(N) and a gate of the eighth transistor T64, and the first low potential line is connected to another one of the source/drain of the seventh transistor T62 and another one of the source/drain of the eighth transistor T64.

The second low frequency control line is configured to transmit a second low frequency control signal LC2.

In an embodiment, the feedback module includes a first feedback transistor T42, where one of a source/drain of the first feedback transistor T42 is connected to the pull-up node Q(N), a gate of the first feedback transistor T42 is connected to another one of the source/drain of the second transistor T53 and the one of the source/drain of the fourth transistor T54, and another one of the source/drain of the first feedback transistor T42 is connected to the first low potential line.

In an embodiment, the feedback module includes a second feedback transistor T43, where one of a source/drain of the second feedback transistor T43 is connected to the pull-up node Q(N), a gate of the second feedback transistor T43 is connected to another one of the source/drain of the sixth transistor T63 and the one of the source/drain of the eighth transistor T64, and another one of the source/drain of the second feedback transistor T43 is connected to the first low potential line.

In an embodiment, each of the gate driving units further includes a pull-up transistor T21, where one of a source/drain of the pull-up transistor T21 is connected to an Nth stage clock line, a gate of the pull-up transistor T21 is connected to the pull-up node Q(N), and another one of the source/drain of the pull-up transistor T21 is connected to an Nth stage scanning line.

The Nth stage clock line is configured to transmit an Nth stage clock signal CK(N). The Nth stage scanning line is configured to transmit an Nth stage scanning signal G(N).

In an embodiment, each of the gate driving units further includes a cascade transistor T22, where one of a source/drain of the cascade transistor T22 is connected to the Nth stage clock line, a gate of the cascade transistor T22 is connected to the pull-up node Q(N), and another one of the source/drain of the cascade transistor T22 is connected to an Nth stage cascade line.

The Nth stage cascade line is configured to transmit an Nth stage cascade signal ST(N).

In an embodiment, each of the gate driving units further includes a transistor T44, where one of a source/drain of the transistor T44 is connected to another of the source/drain of the pull-up control transistor T11 and the pull-up node Q(N), another one of the source/drain of the transistor T44 is connected to the first low potential line, and a gate of the transistor T44 is connected to a start line.

It should be noted that the start line is configured to transmit a start signal STV, which may disable the gate driving circuit from providing an output signal with pulses in the blank period of each frame.

In an embodiment, each of the gate driving units further includes a transistor T72, where one of a source/drain of the transistor T72 is connected to another one of the source/drain of the cascade transistor T22 and the Nth stage cascade line, another one of the source/drain of the transistor T72 is connected to the first low potential line, and a gate of the transistor T72 is connected to one of the source/drain of the fourth transistor T54.

In an embodiment, each of the gate driving units further includes a transistor T32, where one of a source/drain of the transistor T32 is connected to another one of a source/drain of the pull-up transistor T21 and the Nth stage scanning line, another one of the source/drain of the transistor T32 is connected to the second low potential line, and a gate of the transistor T32 is connected to one of the source/drain of the fourth transistor T54.

It should be noted that the second low potential line is configured to transmit a low potential signal VSSG.

In an embodiment, each of the gate driving units further includes a capacitor Cbt, where one terminal of the capacitor Cbt is connected to the pull-up node Q(N), and the other terminal of the capacitor Cbt is connected to the Nth stage scanning line.

In an embodiment, each of the gate driving units further includes a transistor T73, where one of a source/drain of the transistor T73 is connected to the Nth stage cascade line, another one of the source/drain of the transistor T73 is connected to the first low potential line, and a gate of the transistor T73 is connected to the one of the source/drain of the seventh transistor T62.

In an embodiment, each of the gate driving units further includes a transistor T33, where one of the source/drain of the transistor T33 is connected to the Nth stage scanning line, another one of the source/drain of the transistor T33 is connected to the second low potential line, and a gate of the transistor T33 is connected to one of the source/drain of the seventh transistor T62.

In an embodiment, each of the gate driving units further includes a transistor T41, where one of a source/drain of the transistor T41 is connected to the pull-up node Q(N), another one of the source/drain of the transistor T41 is connected to the first low potential line, and a gate of the transistor T41 is connected to an (N+8)th stage cascade line.

It should be noted that the (N+8)th stage cascade line is configured to transmit an (N+8)th stage cascade signal ST(N+8).

In an embodiment, each of the gate driving units further includes a transistor T31, where one of a source/drain of the transistor T31 is connected to the Nth stage scanning line, another one of the source/drain of the transistor T31 is connected to the second low potential line, and a gate of the transistor T31 is connected to the (N+8)th stage cascade line.

In an embodiment, the above-mentioned transistors may be N-channel type thin film transistors, specifically N-channel type metal oxide thin film transistors, and preferably also N-channel type indium gallium zinc oxide thin film transistors.

In an embodiment, the above-mentioned transistors may be P-channel type thin film transistors, specifically P-channel type polysilicon thin film transistors, and preferably also P-channel type low-temperature polysilicon thin film transistors.

Figure 2:
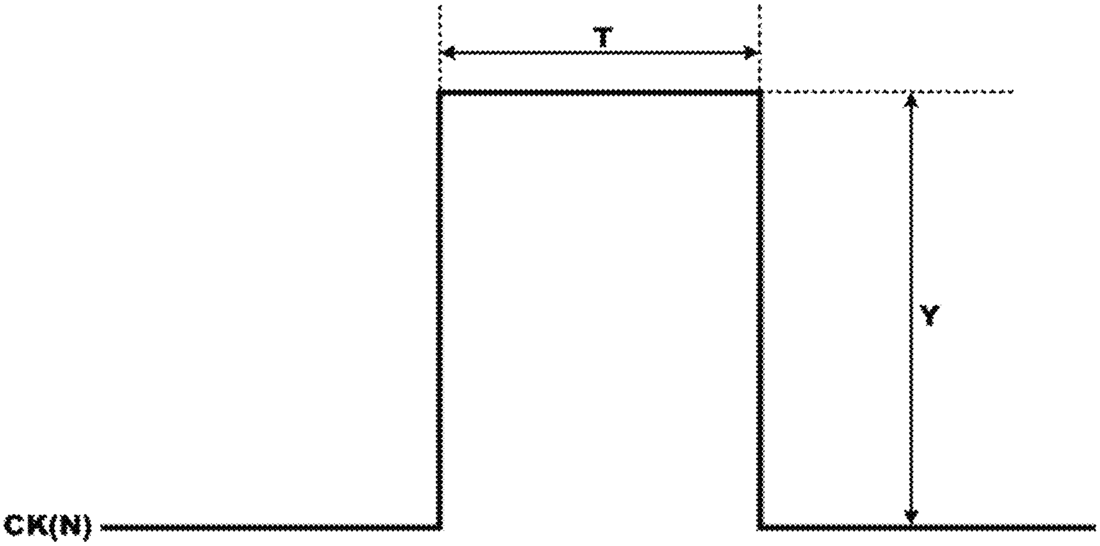
FIG. 2 is a waveform diagram of CK(N) in the related art of FIG. 1.

FIG. 2 is a waveform diagram of CK(N) in the related art in FIG. 1. The pulse amplitude and pulse duration of the Nth stage clock signal CK(N) before the unchamfered angle are Y and T, respectively. Since the Nth stage clock signal CK(N) is not chamfered, neither the Jth stage scanning signal nor the Jth stage cascade signal is chamfered. Accordingly, the pull-up control module 30 keeps the potential increasing speed of the pull-up node Q(N) constant, which does not change.

Figure 3:
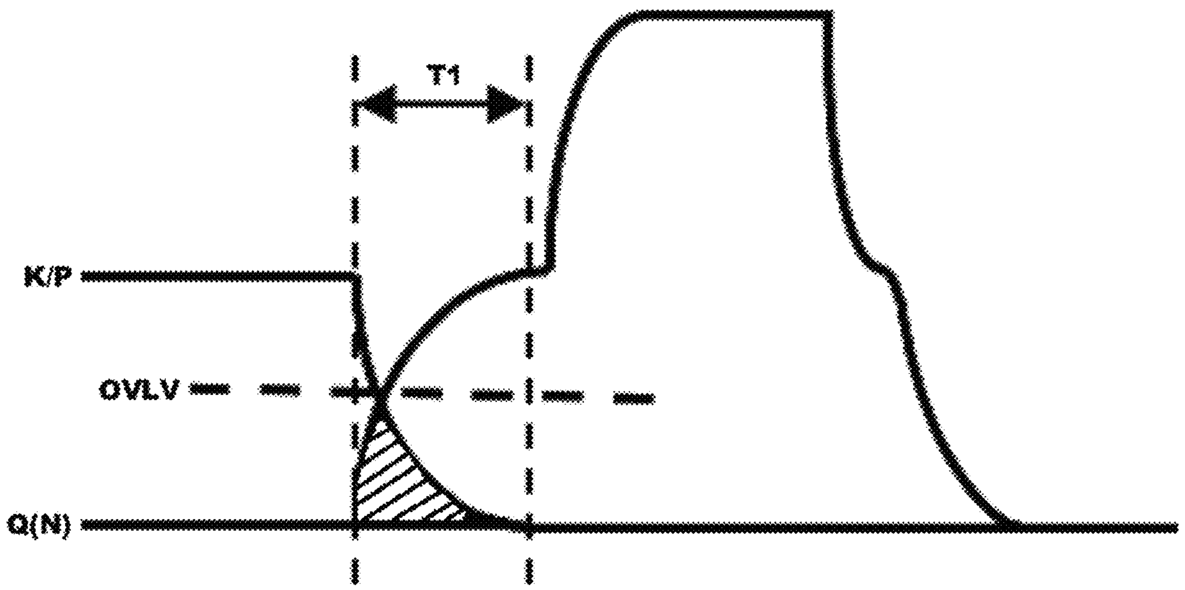
FIG. 3 is a waveform diagram of the gate driving circuit of FIG. 1 during a precharge period.

FIG. 3 is a waveform diagram of the gate driving circuit shown in FIG. 1 during a precharge period. Before the precharge period T1, since the potential of the pull-up node Q(N) is low, the potential of the gate of the first feedback transistor T42, that is, the potential of a K/P node, is high. In the precharge period T1, the pull-up control module 30 starts to charge the pull-up node Q(N), and since the potential variation trends of both the pull-up node Q(N) and the K/P node are opposite, a voltage in which both potentials of the pull-up node Q(N) and the K/P node are equal is defined as an overlap voltage OVLV.

It should be understood that the lower the overlap voltage OVLV is, the lower the potential of the pull-up node Q(N) when the feedback module is turned off is. The lower potential of the pull-up node Q(N) may decrease a voltage difference between the pull-up node Q(N) and the first low potential signal VSSQ, and thus the better the anti-leakage effect of the pull-up node Q(N) is also, and the potential of the pull-up node Q(N) can be more saturated.

Figure 4:
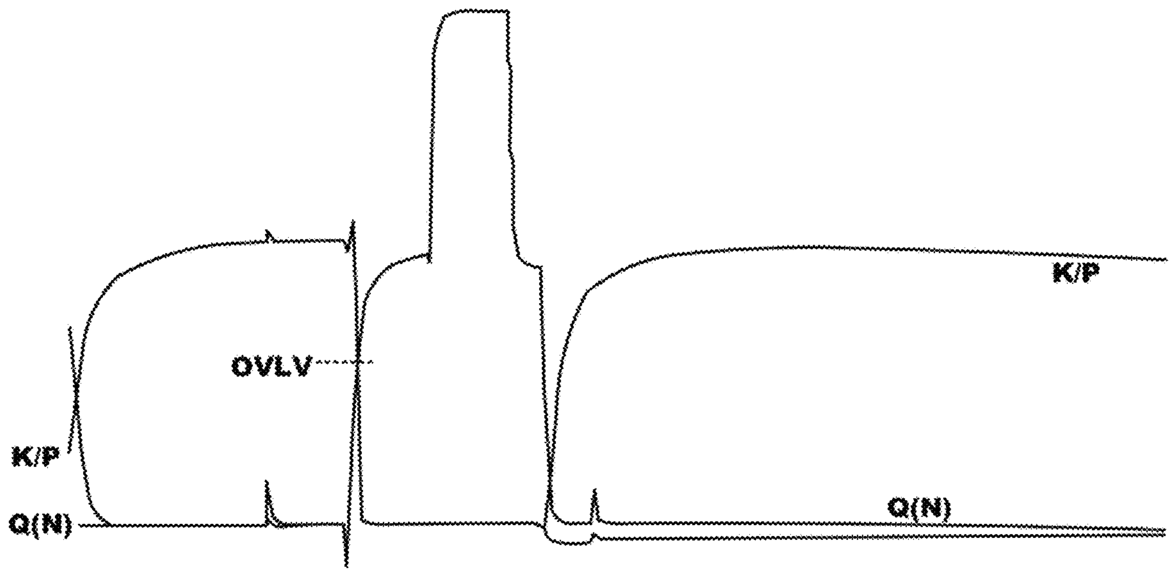
FIG. 4 is a waveform diagram of various nodes driven by CK(N) in FIG. 2.

FIG. 4 is a waveform diagram of various nodes driven by CK(N) in FIG. 2. Since the Nth stage clock signal CK(N) in FIG. 2 is not chamfered, the pull-up control module 30 keeps the charging speed of the pull-up node Q(N) constant. The potential of the pull-up node Q(N) is continuously increased at a faster speed, while the potential variation trend of the node K/P is hardly changed, which may result in the higher overlap voltage OVLV, for example, 10 V. It should be illustrated that the potential of the pull-up node Q(N) is higher when the feedback module is turned off, and the potential of the pull-up node Q(N) is higher, the voltage difference between the pull-up node Q(N) and the first low potential signal VSSQ can be increased. Therefore, the anti-leakage effect of the pull-up node Q(N) may be deteriorated, and it is difficult for the potential of the pull-up node Q(N) to be charged to saturation, which tends to cause leakage of the pull-up node Q(N).

In view of the above-mentioned technical problem of leakage of the pull-up node Q(N), the embodiments of present application construct the pull-up control module 30 for stepwise increasing the potential of the pull-up node Q(N). The inversion module is configured to output an anti-leakage control signal in response to the increased potential of the pull-up node Q(N). The feedback module is configured to reduce leakage from the pull-up node Q(N) to the first low potential line in response to the anti-leakage control signal.

It should be understood that, according to the gate driving circuit provided in the present embodiment, the potential of the pull-up node Q(N) is stepwise increased by the pull-up control module 30, so that the potential increasing speed of the pull-up node Q(N) is reduced. When the potential of the pull-up node Q(N) is lower, the feedback module can be controlled to be turned off by the inversion module, thereby improving a phenomenon of leakage of the pull-up node Q(N) through the feedback module.

In addition, the leakage of the feedback module is reduced or avoided, which improves an abnormal operation of the feedback module and facilitates improvement of the service life of the feedback module and the charging saturation of the pull-up node Q(N), thereby improving the operation reliability of the gate driving circuit.

In addition, the pull-up module stepwise increases the potential of the pull-up node Q(N), which may affect the potential charging speed of the pull-up node Q(N). However, since the effective charging time of the control data signal is usually located in the pulse duration of the rear part of the scanning signal which is output by the gate driving circuit during charging of the control data signal, the pulse duration of the front part of the scanning signal does not affect the effective charging time regardless of the waveform.

Figure 5:
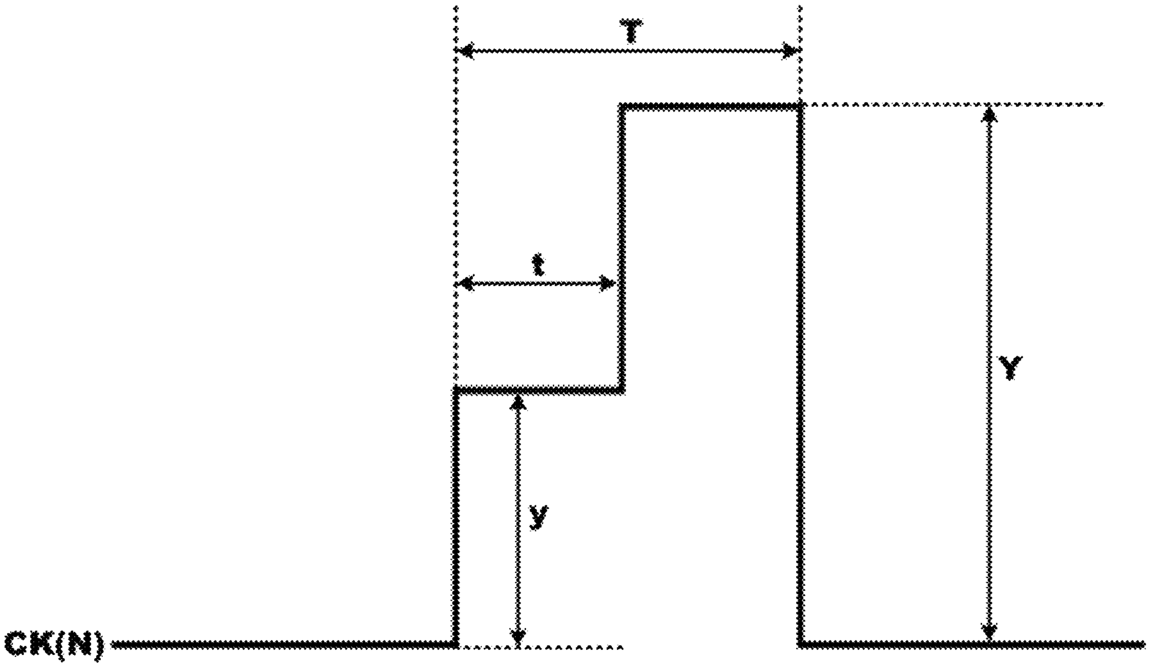
FIG. 5 is a waveform diagram of CK(N) according to an embodiment of the present application.

FIG. 5 is a waveform diagram of a CK(N) according to an embodiment of the present application. the Nth stage clock line in the present embodiment is configured to transmit an Nth stage clock signal CK(N) having a trimmed rising edge compared with that shown in FIG. 2. It can be seen from the configuration of the gate driving circuit shown in FIG. 1 that an Nth stage scanning signal G(N) transmitted by the Nth stage scanning line is also provided with a trimmed rising edge, and an Nth stage cascade signal ST(N) transmitted by an Nth stage cascade line is also provided with a trimmed rising edge. Since the Nth stage scanning signal G(N) has the same waveform as that of the Jth stage scanning signal and a phase lagging behind that of the Jth stage scanning signal, and the Nth stage cascade signal ST(N) has the same waveform as that of the Jth stage cascade signal and a phase lagging behind that of the Jth stage cascade signal, the Jth stage scanning signal transmitted by the Jth stage scanning line is also provided with a trimmed rising edge and the Jth stage cascade signal transmitted by the Jth stage cascade line is also provided with a trimmed rising edge.

It should be noted that the pull-up control transistor T11 can transmit the Jth stage scanning signal having the trimmed rising edge to the pull-up node Q(N) under the control of the Jth stage cascade signal having the trimmed rising edge, so as to realize transformation from a slow potential increasing speed to a fast potential increasing speed of the pull-up node Q(N).

In an embodiment, since both the Jth stage cascade signal and the Jth stage scanning signal are the same, they can also be switched.

Where J is less than N. For example, J may be any one of N−1 to N−9, and further may be N−6 as shown in FIG. 1. Correspondingly, the Jth stage scanning signal is the (N−6)th stage scanning signal G(N−6), and the Jth stage cascade signal is the (N−6)th stage cascade signal ST(N−6).

It should be noted that the configuration of the pull-up control module 30 is not limited to an embodiment in which the pull-up control transistor T11 is included, but may be another configuration in which stepwise increasing of the potential of the pull-up node Q(N) can be realized.

In an embodiment, as shown in FIG. 5, an initial moment of the trimmed rising edge is the same as an initial moment of a rising edge of the Nth stage clock signal CK(N) in timing, and a ratio of duration t of the trimmed rising edge to pulse duration T of the Nth stage clock signal CK(N) is greater than or equal to ¼ and less than or equal to ⅓.

It should be noted that the range in which the ratio between the two is set in the present embodiment does not affect the effective charging time of the display panel, and may improve leakage of the pull-up node Q(N).

In an embodiment, as shown in FIG. 5, the ratio of the potential y of the trimmed rising edge to the pulse amplitude Y of the Nth stage clock signal CK(N) is greater than or equal to ⅓ and less than or equal to ⅔.

It should be noted that the range in which the ratio between the two is set in the present embodiment does not affect the effective charging time of the display panel, and may further improve leakage of the pull-up node Q(N).

In an embodiment, as shown in FIG. 5, the ratio of the potential y of the trimmed rising edge to the pulse amplitude Y of the Nth stage clock signal CK(N) is ½.

It should be noted that the specific value of the ratio of the two provided in the present embodiment does not affect the effective charging time of the display panel, and can optimally improve leakage of the pull-up node Q(N).

In other words, the output terminal of the pull-up control module 30, i.e., the pull-up control node Q(N), is used to provide a pull-up control signal including at least one step pulse, where each step pulse includes a first potential pulse and a second potential pulse in succession, and the potential of the first potential pulse is lower than that of the second potential pulse.

It should be noted that the potential of the first potential pulse may be the potential y of the trimmed rising edge shown in FIG. 5. The potential of the second potential pulse may be the pulse amplitude Y shown in FIG. 5.

In an embodiment, each step pulse further includes a third potential pulse (not shown) following the second potential pulse, where the potential of the second potential pulse is lower than the potential of the third potential pulse.

It should be understood that each step pulse of the pull-up control signal constructed in the present embodiment has three potentials which are sequentially increased, which can further control the potential increasing speed of the pull-up node Q(N). For example, when the pull-up node Q(N) is charged with the first potential, the pull-up node Q(N) has the slowest potential increasing speed. When the pull-up node Q(N) is charged with the second potential, the pull-up node Q(N) is a faster potential increasing speed. When the pull-up node Q(N) is charged with the third potential, the pull-up node Q(N) has the fastest potential increasing speed.

In an embodiment, each step pulse may further include a plurality of sequentially increased potentials following the third potential.

Figure 6:
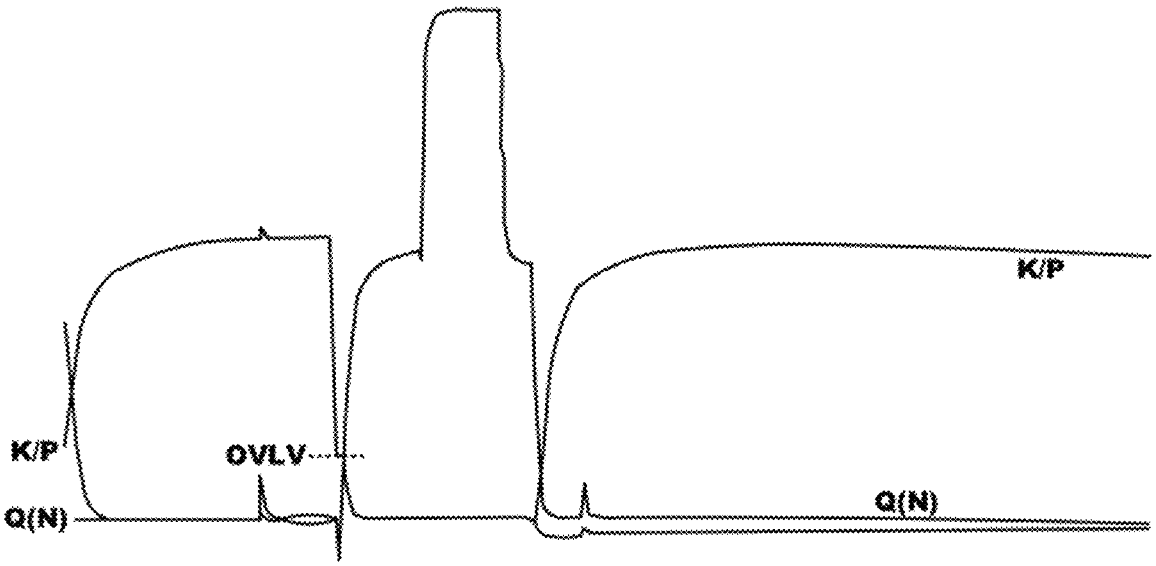
FIG. 6 is a waveform diagram of various nodes driven by CK(N) in FIG. 5.

FIG. 6 is a waveform diagram of various nodes driven by CK(N) in FIG. 5. Since the Nth stage clock signal CK(N) transmitted by the Nth stage clock line in FIG. 5 has a trimmed rising edge, the pull-up control module 30 can increase the potential of the pull-up node Q(N) in a manner that the potential increasing speed is transformed from a slow speed to a fast speed, and the potential variation trend of the node K/P is hardly changed, which may result in the lower overlap voltage OVLV, for example, −6.8V. It should be illustrated that the potential of the pull-up node Q(N) is lower when the feedback module is turned off, and the potential of the pull-up node Q(N) is lower, which may further reduce the voltage difference between the pull-up node Q(N) and the first low-potential signal VSSQ. The anti-leakage effect of the pull-up node Q(N) may become better, and the potential of the pull-up node Q(N) can be also charged to saturation, which improves leakage of the pull-up node Q(N).

In an embodiment, the present embodiment provides a display panel including the gate driving circuit in at least one of the above-described embodiments.

It should be understood that, according to the display panel provided in the present embodiment, the potential of the pull-up node Q(N) is stepwise increased by the pull-up control module 30, so that the potential increasing speed of the pull-up node Q(N) is reduced. When the potential of the pull-up node Q(N) is lower, the feedback module can be controlled to be turned off by the inversion module, thereby improving a phenomenon of leakage of the pull-up node Q(N) through the feedback module.

In addition, the leakage of the feedback module is reduced or avoided, which improves an abnormal operation of the feedback module and facilitates improvement of the service life of the feedback module and the charging saturation of the pull-up node Q(N), thereby improving the operation reliability of the gate driving circuit.

In addition, the pull-up module is to stepwise increase the potential of the pull-up node Q(N), which may affect the potential charging speed of the pull-up node Q(N). However, since the effective charging time of the control data signal is usually located in the pulse duration of the rear part of the scanning signal which is output by the gate driving circuit during charging of the control data signal, the pulse duration of the front part of the scanning signal does not affect the effective charging time regardless of the waveform.

In the foregoing embodiments, descriptions of the embodiments are emphasized. A portion that is not described in detail in an embodiment may refer to related descriptions in another embodiment.

The gate driving circuit and the display panel provided in the embodiments of the present disclosure are described in detail above. In this specification, principles and implementations of the present disclosure are illustrated by applying specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A gate driving circuit, comprising a plurality of cascaded gate driving units, wherein each of the gate driving units comprises:

a pull-up control module, wherein an output terminal of the pull-up control module is connected to a pull-up node, for stepwise increasing a potential of the pull-up node;

an inversion module, wherein an input terminal of the inversion module is connected to the pull-up node, for outputting an anti-leakage control signal in response to an increased potential of the pull-up node; and a feedback module, wherein a control terminal of the feedback module is connected to an output terminal of the inversion module, one terminal of the feedback module is connected to the pull-up node, and another terminal of the feedback module is connected to a first low potential line, for reducing leakage from the pull-up node to the first low potential line in response to the anti-leakage control signal, wherein, the pull-up control module includes a pull-up control transistor, wherein one of a source/drain of the pull-up control transistor is connected to a Jth stage scanning line, a gate of the pull-up control transistor is connected to a Jth stage cascade line, and another one of the source/drain of the pull-up control transistor is connected to the pull-up node;

wherein the Jth stage scanning line is configured to transmit a Jth stage scanning signal having a trimmed rising edge, and the Jth stage cascade line is configured to transmit a Jth stage cascade signal having a trimmed rising edge;

wherein each of the gate driving units further includes: a pull-up transistor, wherein one of a source/drain of the pull-up transistor is connected to an Nth stage clock line, a gate of the pull-up transistor is connected to the pull-up node, and another one of the source/drain of the pull-up transistor is connected to an Nth stage scanning line; and a cascade transistor, wherein one of a source/drain of the cascade transistor is connected to the Nth stage clock line, a gate of the cascade transistor is connected to the pull-up node, and another one of the source/drain of the cascade transistor is connected to an Nth stage cascade line;

wherein the Nth stage clock line is configured to transmit an Nth stage clock signal having a trimmed rising edge; the Nth stage scanning line is configured to transmit an Nth stage scanning signal having a trimmed rising edge, a waveform of the Nth stage scanning signal is the same as a waveform of the Jth stage scanning signal and a phase of the Nth stage scanning signal lags behind a phase of the Jth stage scanning signal; a waveform of the Nth stage cascade signal is the same as a waveform of the Jth stage cascade signal, and a phase of the Nth stage cascade signal lags behind a phase of the Jth stage cascade signal; and wherein, a ratio of a potential of the trimmed rising edge to a pulse amplitude of the Nth stage clock signal is greater than or equal to ⅓ and less than or equal to ⅔;

wherein, the pull-up node is configured to provide a pull-up control signal including at least one step pulse, wherein each step pulse of the at least one step pulse includes a first potential pulse and a second potential pulse in succession, and a potential of the first potential pulse is lower than a potential of the second potential pulse.

2. The gate driving circuit of claim 1, wherein, each step pulse of the at least one step pulse further includes a third potential pulse following the second potential pulse, the potential of the second potential pulse being lower than a potential of the third potential pulse.

3. The gate driving circuit of claim 1, wherein, the ratio of the potential of the trimmed rising edge to the pulse amplitude of the Nth stage clock signal is ½.

4. The gate driving circuit of claim 1, wherein, the inversion module includes a first inversion sub-module, wherein the first inversion sub-module includes a first transistor, a second transistor, a third transistor, and a fourth transistor, wherein, one of a source/drain of the first transistor is connected to all of a first low frequency control line, one of a source/drain of the second transistor, and a gate of the first transistor, another one of the source/drain of the first transistor is connected to both a gate of the second transistor and one of a source/drain of the third transistor, another one of the source/drain of the second transistor is connected to one of a source/drain of the fourth transistor, a gate of the third transistor is connected to both the pull-up node and a gate of the fourth transistor, and the first low potential line is connected to both another one of the source/drain of the third transistor and another one of the source/drain of the fourth transistor; and the feedback module includes a first feedback transistor, wherein one of a source/drain of the first feedback transistor is connected to the pull-up node, a gate of the first feedback transistor is connected to both another one of the source/drain of the second transistor and the one of the source/drain of the fourth transistor, and another one of the source/drain of the first feedback transistor is connected to the first low potential line.

5. The gate driving circuit of claim 4, wherein, the inversion module further includes a second inversion sub-module, wherein the second inversion sub-module includes a fifth transistor, a sixth transistor, a seventh transistor, and an eighth transistor, wherein, one of a source/drain of the fifth transistor is connected to all of a second low frequency control line, one of a source/drain of the sixth transistor, and a gate of the fifth transistor, another one of the source/drain of the fifth transistor is connected to both a gate of the sixth transistor and one of a source/drain of the seventh transistor, another one of the source/drain of the sixth transistor is connected to one of a source/drain of the eighth transistor, a gate of the seventh transistor is connected to both the pull-up node and a gate of the eighth transistor, and the first low potential line is connected to both another one of the source/drain of the seventh transistor and another one of the source/drain of the eighth transistor; and the feedback module includes a second feedback transistor, wherein one of a source/drain of the second feedback transistor is connected to the pull-up node, a gate of the second feedback transistor is connected to both another one of the source/drain of the sixth transistor and the one of the source/drain of the eighth transistor, and another one of the source/drain of the second feedback transistor is connected to the first low potential line.

6. A gate driving circuit, comprising a plurality of cascaded gate driving units, wherein each of the gate driving units comprises:

a pull-up control transistor, wherein one of a source/drain of the pull-up control transistor is connected to a Jth stage scanning line, a gate of the pull-up control transistor is connected to a Jth stage cascade line, and another one of the source/drain of the pull-up control transistor is connected to the pull-up node;

a first transistor, wherein one of a source/drain of the first transistor is connected to a first low frequency control line and a gate of the first transistor;

a second transistor, wherein one of a source/drain of the second transistor is connected to the one of the source/drain of the first transistor, and a gate of the second transistor is connected to another one of the source/drain of the first transistor;

a third transistor, wherein one of a source/drain of the third transistor is connected to another one of the source/drain of the first transistor, a gate of the third transistor is connected to the pull-up node, and another one of the source/drain of the third transistor is connected to the first low potential line;

a fourth transistor, wherein one of a source/drain of the fourth transistor is connected to another one of the source/drain of the second transistor, a gate of the fourth transistor is connected to the pull-up node, and another one of the source/drain of the fourth transistor is connected to the first low potential line;

a first feedback transistor, wherein one of a source/drain of the first feedback transistor is connected to the pull-up node, a gate of the first feedback transistor is connected to both another one of the source/drain of the second transistor and the one of the source/drain of the fourth transistor, and another one of the source/drain of the first feedback transistor is connected to the first low potential line;

wherein the Jth stage scanning line is configured to transmit a Jth stage scanning signal having a trimmed rising edge, and the Jth stage cascade line is configured to transmit a Jth stage cascade signal having a trimmed rising edge;

wherein each of the gate driving units further includes: a fifth transistor, wherein one of a source/drain of the fifth transistor is connected to both a second low frequency control line and a gate of the fifth transistor; a sixth transistor, wherein, one of a source/drain of the sixth transistor is connected to the one of the source/drain of the fifth transistor, and a gate of the second transistor is connected to another one of the source/drain of the fifth transistor; a seventh transistor, wherein, one of a source/drain of the seventh transistor is connected to another one of the source/drain of the fifth transistor, a gate of the seventh transistor is connected to the pull-up node, and another one of the source/drain of the seventh transistor is connected to the first low potential line; an eighth transistor, wherein, one of a source/drain of the eighth transistor is connected to another one of the source/drain of the sixth transistor, a gate of the eighth transistor is connected to the pull-up node, and another one of the source/drain of the eighth transistor is connected to the first low potential line; and a second feedback transistor, wherein, one of a source/drain of the second feedback transistor is connected to the pull-up node, a gate of the second feedback transistor is connected to both another one of the source/drain of the sixth transistor and the one of the source/drain of the seventh transistor, and another one of the source/drain of the second feedback transistor is connected to the first low potential line;

wherein each of the gate driving units further includes: a pull-up transistor, wherein one of a source/drain of the pull-up transistor is connected to an Nth stage clock line, a gate of the pull-up transistor is connected to the pull-up node, and another one of the source/drain of the pull-up transistor is connected to an Nth stage scanning line; and a cascade transistor, wherein one of a source/drain of the cascade transistor is connected to the Nth stage clock line, a gate of the cascade transistor is connected to the pull-up node, and another one of the source/drain of the cascade transistor is connected to an Nth stage cascade line;

wherein the Nth stage clock line is configured to transmit an Nth stage clock signal having a trimmed rising edge; the Nth stage scanning line is configured to transmit an Nth stage scanning signal having a trimmed rising edge, a waveform of the Nth stage scanning signal is the same as a waveform of the Jth stage scanning signal and a phase of the Nth stage scanning signal lags behind a phase of the Jth stage scanning signal; a waveform of the Nth stage cascade signal is the same as a waveform of the Jth stage cascade signal, and a phase of the Nth stage cascade signal lags behind a phase of the Jth stage cascade signal; and wherein, a ratio of a potential of the trimmed rising edge to a pulse amplitude of the Nth stage clock signal is greater than or equal to ⅓ and less than or equal to ⅔;

wherein, the pull-up node is configured to provide a pull-up control signal including at least one step pulse, wherein each step pulse of the at least one step pulse includes a first potential pulse and a second potential pulse in succession, and a potential of the first potential pulse is lower than a potential of the second potential pulse.

7. The gate driving circuit of claim 6, wherein, the ratio of the potential of the trimmed rising edge to the pulse amplitude of the Nth stage clock signal is ½.

8. A display panel, comprising the gate driving circuit according to claim 1.

9. The display panel of claim 8, wherein, the ratio of the potential of the trimmed rising edge to the pulse amplitude of the Nth stage clock signal is ½.

10. A display panel, comprising the gate driving circuit according to claim 6.

11. The display panel of claim 10, wherein, the ratio of the potential of the trimmed rising edge to the pulse amplitude of the Nth stage clock signal is ½.

12. A gate driving circuit, comprising a plurality of cascaded gate driving units, wherein each of the gate driving units comprises:

a pull-up control module, wherein an output terminal of the pull-up control module is connected to a pull-up node, for stepwise increasing a potential of the pull-up node;

an inversion module, wherein an input terminal of the inversion module is connected to the pull-up node, for outputting an anti-leakage control signal in response to an increased potential of the pull-up node; and a feedback module, wherein a control terminal of the feedback module is connected to an output terminal of the inversion module, one terminal of the feedback module is connected to the pull-up node, and another terminal of the feedback module is connected to a first low potential line, for reducing leakage from the pull-up node to the first low potential line in response to the anti-leakage control signal, wherein, the pull-up control module includes a pull-up control transistor, wherein one of a source/drain of the pull-up control transistor is connected to a Jth stage scanning line, a gate of the pull-up control transistor is connected to a Jth stage cascade line, and another one of the source/drain of the pull-up control transistor is connected to the pull-up node;

wherein the Jth stage scanning line is configured to transmit a Jth stage scanning signal having a trimmed rising edge, and the Jth stage cascade line is configured to transmit a Jth stage cascade signal having a trimmed rising edge;

wherein each of the gate driving units further includes: a pull-up transistor, wherein one of a source/drain of the pull-up transistor is connected to an Nth stage clock line, a gate of the pull-up transistor is connected to the pull-up node, and another one of the source/drain of the pull-up transistor is connected to an Nth stage scanning line; and a cascade transistor, wherein one of a source/drain of the cascade transistor is connected to the Nth stage clock line, a gate of the cascade transistor is connected to the pull-up node, and another one of the source/drain of the cascade transistor is connected to an Nth stage cascade line;

wherein the Nth stage clock line is configured to transmit an Nth stage clock signal having a trimmed rising edge; the Nth stage scanning line is configured to transmit an Nth stage scanning signal having a trimmed rising edge, a waveform of the Nth stage scanning signal is the same as a waveform of the Jth stage scanning signal and a phase of the Nth stage scanning signal lags behind a phase of the Jth stage scanning signal; a waveform of the Nth stage cascade signal is the same as a waveform of the Jth stage cascade signal, and a phase of the Nth stage cascade signal lags behind a phase of the Jth stage cascade signal; and wherein, a ratio of a potential of the trimmed rising edge to a pulse amplitude of the Nth stage clock signal is greater than or equal to ⅓ and less than or equal to ⅔; and wherein, the inversion module includes a first inversion sub-module, wherein the first inversion sub-module includes a first transistor, a second transistor, a third transistor, and a fourth transistor, wherein, one of a source/drain of the first transistor is connected to all of a first low frequency control line, one of a source/drain of the second transistor, and a gate of the first transistor, another one of the source/drain of the first transistor is connected to both a gate of the second transistor and one of a source/drain of the third transistor, another one of the source/drain of the second transistor is connected to one of a source/drain of the fourth transistor, a gate of the third transistor is connected to both the pull-up node and a gate of the fourth transistor, and the first low potential line is connected to both another one of the source/drain of the third transistor and another one of the source/drain of the fourth transistor; and the feedback module includes a first feedback transistor, wherein one of a source/drain of the first feedback transistor is connected to the pull-up node, a gate of the first feedback transistor is connected to both another one of the source/drain of the second transistor and the one of the source/drain of the fourth transistor, and another one of the source/drain of the first feedback transistor is connected to the first low potential line.

13. The gate driving circuit of claim 12, wherein, the inversion module further includes a second inversion sub-module, wherein the second inversion sub-module includes a fifth transistor, a sixth transistor, a seventh transistor, and an eighth transistor, wherein, one of a source/drain of the fifth transistor is connected to all of a second low frequency control line, one of a source/drain of the sixth transistor, and a gate of the fifth transistor, another one of the source/drain of the fifth transistor is connected to both a gate of the sixth transistor and one of a source/drain of the seventh transistor, another one of the source/drain of the sixth transistor is connected to one of a source/drain of the eighth transistor, a gate of the seventh transistor is connected to both the pull-up node and a gate of the eighth transistor, and the first low potential line is connected to both another one of the source/drain of the seventh transistor and another one of the source/drain of the eighth transistor; and the feedback module includes a second feedback transistor, wherein one of a source/drain of the second feedback transistor is connected to the pull-up node, a gate of the second feedback transistor is connected to both another one of the source/drain of the sixth transistor and the one of the source/drain of the eighth transistor, and another one of the source/drain of the second feedback transistor is connected to the first low potential line.

14. A display panel, comprising the gate driving circuit according to claim 12.

15. A display panel, comprising the gate driving circuit according to claim 13.

* * * * *